(No Model.)
F. CORDREY.
HARVESTER.
No. 332,136. Patented Dec. 8, 1885.
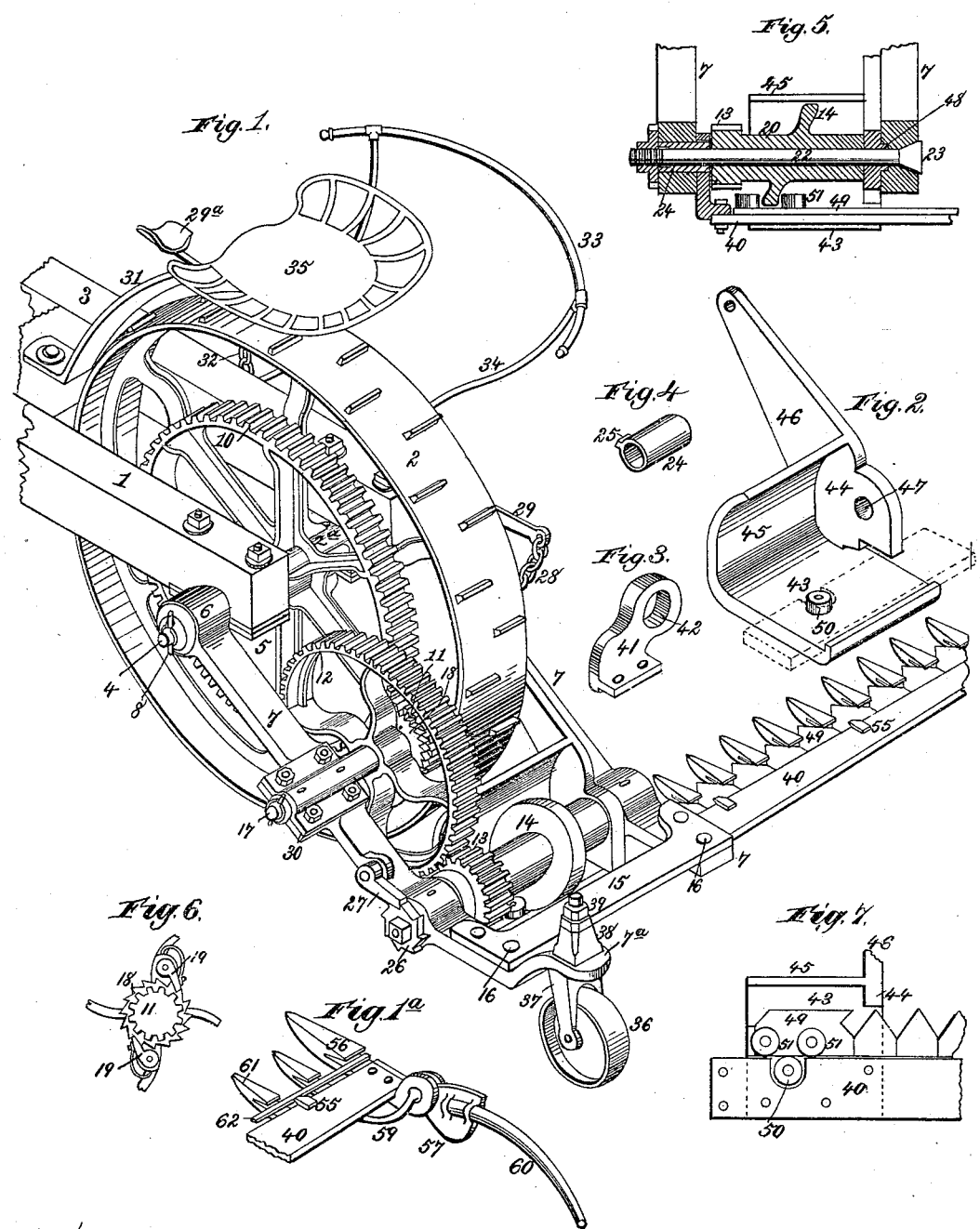
Witnesses:
Jos. L. Coombs
Robert Everett
Inventor.
Francis Cordrey,
By James L. Norris.
Attorney.

UNITED STATES PATENT OFFICE.

FRANCIS CORDREY, OF FORT WAYNE, INDIANA.

HARVESTER.

SPECIFICATION forming part of Letters Patent No. 332,136, dated December 8, 1885.

Application filed January 8, 1885. Serial No. 152,339. (No model.)

*To all whom it may concern:*

Be it known that I, FRANCIS CORDREY, a citizen of the United States, residing at Fort Wayne, Allen county, Indiana, have invented new and useful Improvements in Harvesters, of which the following is a specification.

This invention relates to that class of rear-cut harvesters in which the cutter-bar projects laterally from the draft tongue, and the cutting mechanism is mounted in a hinged frame hung upon the axis of the traction-wheel and combined with lever devices for raising and lowering it from the driver's seat.

The invention will first be fully described in connection with the accompanying drawings, and then set forth in the claims.

In said drawings, Figure 1 is a perspective view of a harvester embodying my improvements, the outer portion of the cutting mechanism being broken off. Fig. 1ª represents said outer portion of the cutting mechanism and its shoe or track-clearer. Fig. 2 is a detail view of the shoe or hanger to which the finger-bar is attached. Fig. 3 is a bracket attached to the inner end of said finger-bar for connecting it with the axis of a spiral cam-wheel gearing. Fig. 4 is a detail view of a sleeve which passes through the bracket seen in Fig. 3, and is used for tightening the cam-gearing. Fig. 5 is a sectional view representing the gearing-frame and the hanger which supports the finger and cutter-bars, and also showing the cam-gearing. Fig. 6 is a detail view of the pinion and ratchet-and-pawl device for connecting the main gear-wheel with the remainder of the gearing. Fig. 7 is a detail view of the finger and cutter bars and anti-friction rollers.

The reference-numeral 1 designates a draft-pole extending in a straight line at one side of the drive or traction wheel 2, and on the other side of the latter there extends from the axis thereof a branch or support, 3, of said draft-pole 1, which is connected in front with the main pole 1. Between the members 1 and 3 the traction-wheel 2 is arranged, the same being fitted on a transverse shaft, 4, which is fitted in boxes 5, secured to the under side of the members 1 and 3. The shaft 4 is extended, and serves to receive eyes or bearings 6 on the upper ends of arms 7, constituting the main position of a frame which supports the driving, gearing, and cutting mechanism. The arms can rock or turn on the shaft 4, and they are prevented from slipping off the same by linchpins 8 or other fastening devices and suitable washers. The traction-wheel has an elongated hub, $2^a$, which turns on the shaft 4, and said hub carries a large spur-wheel, 10, which serves to transmit motion through the intervention of a pinion, 11, and spur-wheel 12 to a pinion, 13, and a collar with a spiral cam-disk, 14, the latter engaging directly with the cutter-bar and serving to impart a reciprocating movement to the same.

The arms 7, as already stated, have their front ends loosely connected with the shaft of the traction-wheel, and are disposed on opposite sides of said wheel. These arms extend in backward and downward direction for the purpose of placing the driving and cutting mechanism in such positions as will serve to draw or hold the traction-wheel more firmly to the ground, thereby preventing said wheel from slipping or sliding when the machine is in motion. The rear ends of the arms 7 are held in place by a cross-tie, 15, secured to said arms by bolts or rivets 16. A box or pillow-block, 30, secured to one of the arms 7, constitutes the bearing for a short rotary shaft, 17, which is prevented from moving from said box by a suitable key and washer. This shaft 17 carries at its inner end the pinion 11, which meshes into the master-wheel 10, and at the side of said pinion is keyed or secured a ratchet disk or wheel, 18, having its teeth made to engage with a pair of pawls, 19, pivoted to the spokes or arms of the power-transmitting gear-wheel 12. The object of the ratchet-and-pawl devices is to lock the wheel 12 to the shaft 17 when the machine is moving forward and the cutting mechanism is being actuated; but when a retrograde movement of the machine takes place the pawls are released from the teeth of the ratchet-wheel, and the shaft 17 and its pinion then revolve without the wheel 12. The latter, as already stated, meshes into a pinion, 13, which is formed on a hub or body, 20, carrying also the spiral cam disk or wheel 14. This hub 20 fits and turns on a stationary axis or shaft, 22, which has an angular head, 23, at one end, that is seated in a recess in one of the arms 7, as is seen in Fig. 5. The other end of the axis 22 passes through a cylindrical sleeve or bushing, 24, which is held in an opening made in the other arm 7. This bushing has a nib or spline, 25, which fits into a groove made in its seat in the arm 7. The object of this connection is to prevent the bushing from turning against the nut 26, and allowing it to be given a limited lengthwise movement on the axis 22. The outer end of the latter is screw-threaded, and receives a nut, 26, which has ratchet-teeth that engage with a pawl, 27, pivoted to the arm 7. By turning said nut the bushing can be adjusted so as to cause its inner end to bear against the hub of the pinion and spiral cam-wheel, thereby holding the latter firmly in place and preventing any endwise movement thereof. It is obvious that as the parts exposed to friction wear away, the nut 26 can be used to again tighten up the parts. The foot-lever 29 is fulcrumed on the draft tongue or beam at some point above the axis of the traction-wheel, and is extended in a forward direction, terminating at its front end in a treadle or foot-piece, 29$^a$. This lever is used for raising and lowering the finger-guards.

The driver's seat 35 is arranged above the machine, it being mounted on an arm, 31. A stop-chain or other suitable device, 32, capable of being lengthened or shortened, is resorted to for giving more or less movement to the lever to hold the finger-guards at different elevations above the ground. A guard-railing, 33, surrounds the driver's seat, and is attached to arms 34, which rise from the draft-tongue 3, as is seen in Fig. 1. The gearing and cutter-bar frame is supported at its rear by a pivot or caster wheel, 36, which is so arranged as to conform to the movement of said gearing-frame under which it is supported. The pivot-wheel 36 is journaled in a forked hanger, 37, which has a vertical round post or stem passing through a block, 38, set on the top of an extension, 7$^a$, of the arm 7. A nut, 39, placed in the screw-threaded end of the post of the pivot-wheel, or a key passed through a slot in the post, serves to hold the same in place and allows the post to swivel or turn in the block 38. The latter can be removed from the top of the bar-extension 7$^a$ and placed beneath the same for the purpose of elevating the gearing-frame. The arms of the forked hanger between which the pivot-wheel is set are inclined in a rearward direction, as is seen in Fig. 1. The finger-bar (designated by the numeral 40) has its inner end riveted or bolted to a stay-piece, 41, which is provided with a bottom ledge for the reception of the finger-bar, and is bent upward and forward and made to terminate in an eye, 42. This eye fits on the inner end of the bushing 24, and occupies the space between the arm 7 and the pinion 13 on the hub of the spiral cam-wheel, as is seen more clearly in Fig. 5. The finger-bar is also secured to the base-plate 43 of a hanger device or drag-shoe which has a vertical shoulder, 44, a front wall, 45, and an arm, 46, extending in a forward direction from the shoulder 44. An eye, 47, is made in said shoulder for the passage of the axis 22 of the spiral cam-wheel, and on the outer side of said opening, and surrounding the same, is a boss or projection, 48, which enters a cavity made in the arm 7 around the opening for the axis 22. This boss, in connection with the bushing 24, serves to hold the hanger device or drag-shoe frame in place when the axis of the spiral cam-wheel is withdrawn for the purpose of removing the section or cutter bar. The rear portion of the shoulder 44 is made to drop downward and forward, forming the upper part of the opening in which the cutter-bar or sections slide. The arm 46, extending forward from the shoulder 44, lies against the inner face of the gearing-frame, and is connected at its front end with the chain 28 of the foot-lever 29, by means of which the cutter-bar can be rocked and the cutting mechanism held in different positions in relation to the ground. The base-plate 43 of the drag-shoe is elevated at its front, so as to form a floor upon which the cutter bar or sections can slide, and a narrow opening is thereby formed between the floor and the front edge of the finger-bar 40, for the reception of the oblong end of the cutter-bar 49. As already stated, the front portion of the drag-shoe is curved upward and formed in one piece with the rocking arm 46; or it may be a separate piece, and suitably fastened to the arm and base-plate 43, so as to constitute a front protecting shield for the spiral cam-wheel 14. A stud or post rising from the base-plate 43 receives a vertical roller, 50, which is countersunk in the finger-bar and moves or rolls in contact with the rear edge of the cutter-bar in order to overcome friction. The cutter-bar is also provided on its oblong inner end with posts, on which are fitted two vertical rollers, 51, between which the spiral cam-wheel operates in order to reciprocate the cutter-bar with as little friction as possible.

Referring to the spiral cam-wheel, it should be stated that it holds such a position in relation to its axis that one revolution of its obliquely-disposed cam will occupy or require a width of air-space equal to the distance necessary for the sliding movement of the cutter-bar plus the thickness or width of the cam of the wheel. This cam has its sides of uniform shape, and is so formed upon its hub that any point on its outer surface or edge will be practically at a right angle to the central line of the axis passing through its hub— that is, the spiral cam is set on its hub lengthwise equal to the distance formed in the same direction by the outer portion of the cam, winding on one side of the hub this distance, then back on the other side to the point of starting, thereby pressing properly against the rollers 51 on the heel of the cutter-bar, and without any cramp movement in passing between said rollers. The outer surface of the flange of the spiral cam-wheel may also have a central groove for the purpose of setting one roller on the cutter-bar between the projecting sides or cams of the flange thus formed, either of these formations practically giving a reciprocal movement. The cutter-bar is held in proper relation to the guard-fingers by the customary cap-plates, 55, attached to the finger-bar and overlapping the cutter-bar. On the outer end of the cutter-bar is a shoe, 56, which is made of a wedge shape, and having an opening therein for the passage of the cutter-bar. This outer shoe has four sharp-corner edges, and carries its depth thickness well toward its point, where it abruptly turns up from its under side. A finger-plate, 57, made somewhat V-shaped, is fitted in an opening in the heel of the shoe 56, and has the portion which enters said opening rounded and provided with an opening. A brace, 59, attached to the finger-bar, is shouldered against the inside of the heel portion of the shoe 56, and projects through the same for the purpose of holding the finger-plate 57 in position for properly bracing the shoe 56, and holding it firmly in place. The brace 59 passes through the finger-plate, as stated, and has a fastening-nut on its outer end.

60 designates a rearwardly-extending finger, which is attached to the finger-plate by rivets or other fastening devices. The guard-fingers 61, attached to the front of the finger-bar, are of the same shape as the outer shoe, 56, so far as their front projection is concerned. The blades or sections constituting the cutter-bar slide back and forth upon a suitable guard-rail, 62, arranged above the shank portions of the guard-fingers, as is shown in Fig. 1ᵃ.

What I claim is—

1. In a harvester, the combination of the drag-shoe or hanger frame consisting of the bottom plate, front wall, apertured side flange, and forwardly-projecting arm, and the detachable bracket with the finger-bar secured to said drag-shoe, and the gearing-frame adapted to support the same, substantially as described.

2. In a harvester, the combination of the gearing-frame, the axle or stationary bolt fitted therein, the adjustable sleeve surrounding said bolt or axle, a spiral cam-wheel having a hub or collar provided with a pinion and fitted loosely on said bolt, a nut on the end of said axle or bolt for adjusting the sleeve, the cutter and finger bars, the power-transmitting gearing, the traction-wheel, and the draft-frame, substantially as described.

3. In a harvester, the combination of the gearing-frame 7, the shaft or stationary bolt 22, fitted in said frame, the spiral cam-wheel comprising the cam 14, projecting from its hub 20, said hub being mounted loosely on the stationary bolt or shaft 22, and provided with a pinion, 13, the finger-bar 40, the cutter-bar 49, having rollers 50 51, the power-transmitting gearing, the traction-wheel, and the draft-frame, substantially as described.

4. In a harvester, the combination of the traction-wheel 2, having an elongated hub, 2ᵃ, mounted on a shaft, 4, and provided with a spur-gear, 10, a gearing-frame having arms 7, mounted in front on the traction-wheel shaft and connected at their rear ends by a cross-tie, 15, a stationary shaft, 22, supported in said gearing-frame, a hub or collar, 20, mounted on said stationary shaft and having a pinion, 13, and a spiral cam-wheel, 14, a short shaft, 17, journaled in a box attached to one arm of the gearing-frame and carrying a pinion, 11, and ratchet-gear 18, the spur-gear wheel 12, having pawls 19, the finger-bar 40, cutter-bar 49, and rollers 50 51, substantially as described.

5. In a harvester, the combination, with the traction-wheel 2, having a spur-gear, 10, mounted on its hub, and the gearing-frame 7, pivotally connected to the shaft of said traction-wheel, of the finger-bar 40, cutter-bar 49, rollers 50 51, stationary shaft 22, supported in the gearing-frame, hub 20, mounted on said shaft and having a pinion, 13, and a spiral cam-wheel, 14, the ratchet-nut 26, pawl 27, shaft 17, carrying pinion 11, and ratchet-gear 18, and the power-transmitting gear 12, having pawls 19, pivoted to its spokes or arms, substantially as described.

6. In a harvester, the combination of the gearing-frame 7, the stay-piece 41, having an eye, 42, the base-plate 43, having a perforated vertical shoulder, 44, front wall, 45, and arms 46, the finger-bar 40, cutter-bar 49, rollers 50 51, the bushing 24, supported in one arm of the gearing-frame, the stationary shaft 22, hub or collar 20, having pinion 13, and spiral cam-wheel 14, the traction-wheel, draft-frame, and power-transmitting gearing, substantially as described.

In testimony whereof I affix my signature in presence of two witnesses.

FRANCIS CORDREY.

Witnesses:
FRED V. GRAHAM,
D. L. HARDING.